Dec. 5, 1967  
JAMES E. WEBB  3,356,320  
ADMINISTRATOR OF THE NATIONAL AERONAUTICS  
AND SPACE ADMINISTRATION  
DEVICE FOR SEPARATING OCCUPANT FROM AN EJECTION SEAT  
Filed Jan. 3, 1966  
4 Sheets-Sheet 3

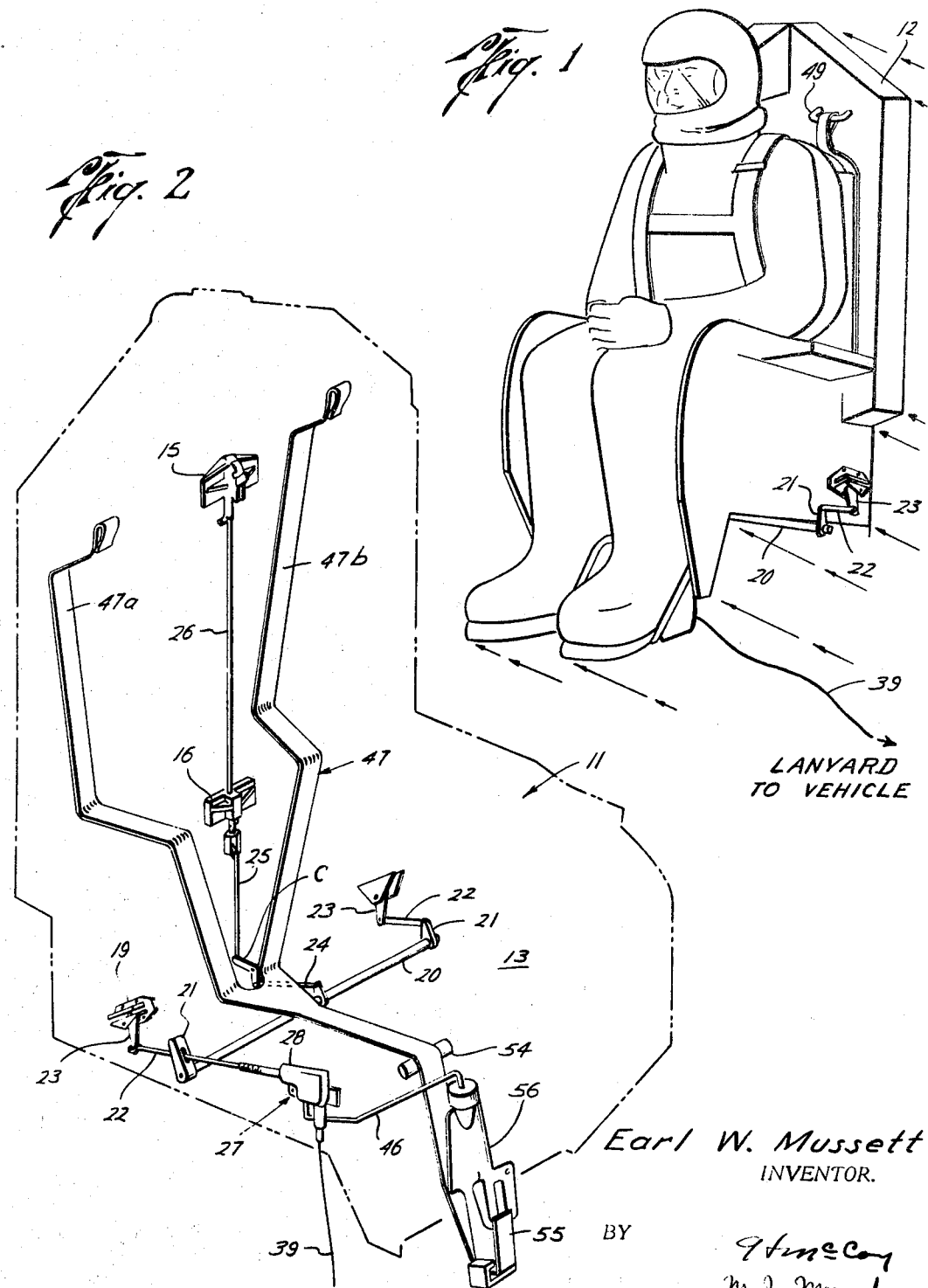

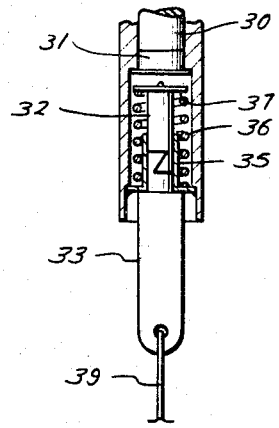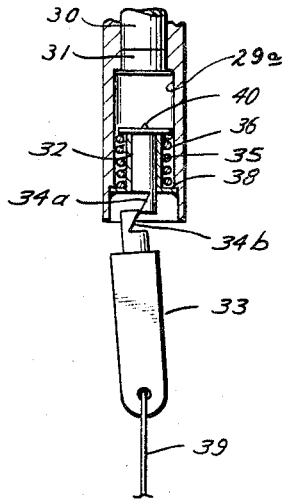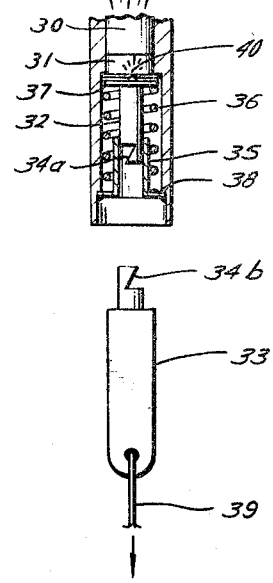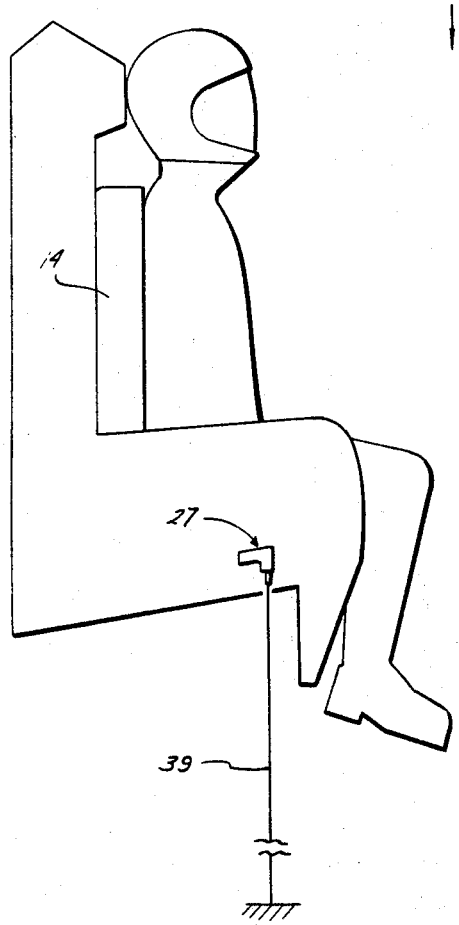

Earl W. Mussett  
INVENTOR.

BY  
ATTORNEYS

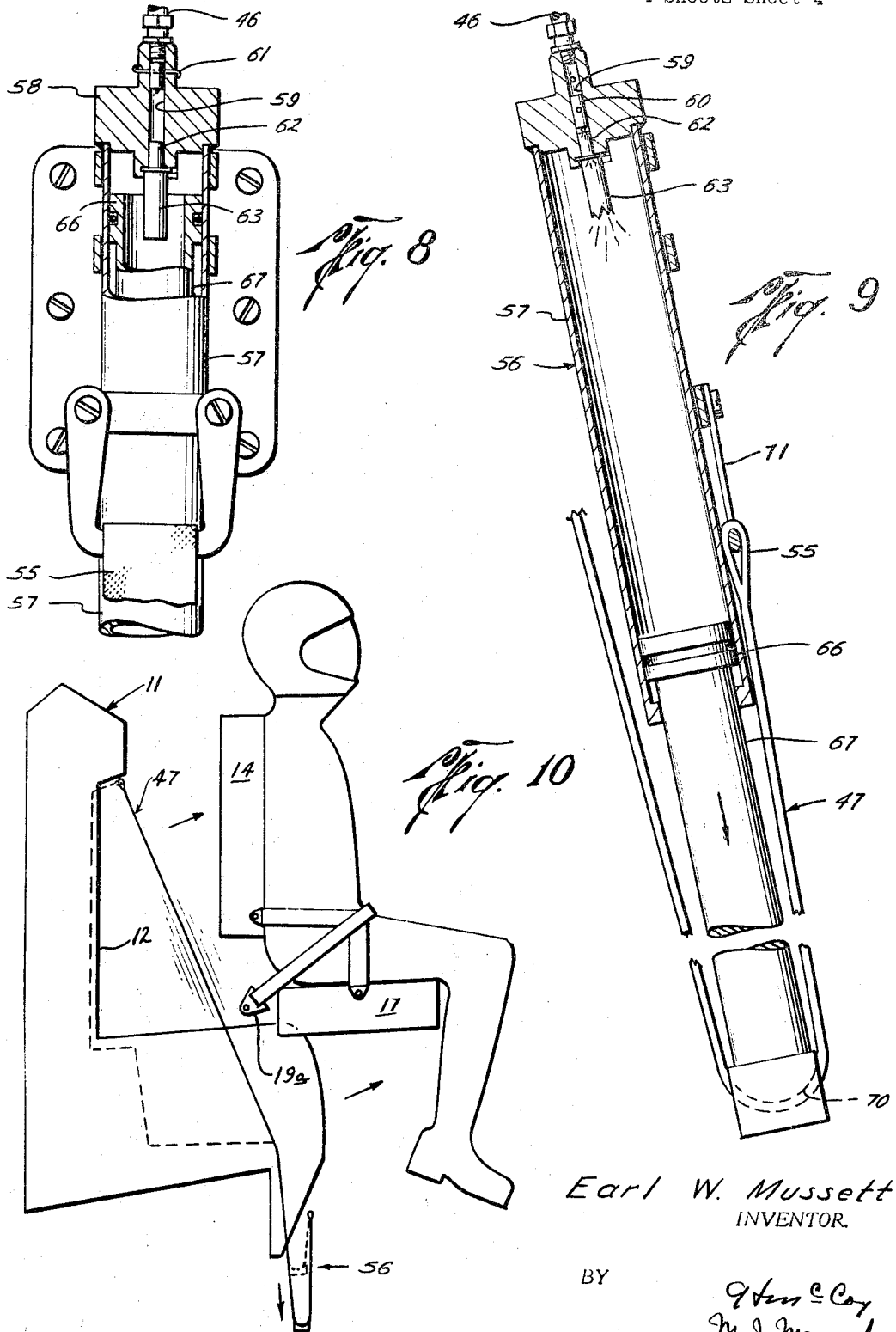

United States Patent Office 3,356,320
Patented Dec. 5, 1967

3,356,320
DEVICE FOR SEPARATING OCCUPANT FROM AN EJECTION SEAT
James E. Webb, administrator of the National Aeronautics and Space Administration with respect to an invention of Earl W. Mussett, Sepulveda, Calif.
Filed Jan. 6, 1966, Ser. No. 519,161
7 Claims. (Cl. 244—122)

ABSTRACT OF THE DISCLOSURE

An apparatus for separating an occupant from a seat structure after its ejection from a vehicle. Upon ejection from the vehicle, a lanyard attached to the vehicle releases a firing pin spring whereby the firing pin ignites an explosive charge which drives a piston and associated mechanical linkage to release tie-down devices which secure the occupant to the seat. Gases from the charge subsequently ignite a second explosive charge which drives the piston of a thruster device attached to one end of an ejection strap which lies between the occupant and the seat. The strap is snapped taut by the thruster action and forcibly separates the occupant from the seat structure.

---

The invention described herein was made in the performance of work under NASA contract and is subject to the provision of Section 305 of the National Aeronautics and Space Act of 1958, Public Law 85-568 (72 Stat. 435; U.S.C. 2457).

This invention relates to an apparatus for separating the occupant of a seat from the seat structure after both have been ejected as a unit from a vehicle such as a spacecraft or airplane. The man-seat separating apparatus is particularly designed as part of a safety system for ejecting an astronaut from a space vehicle while the space vehicle and its propelling rocket are on the launching pad or during the initial launch phase of flight, in order to remove the astronaut from danger if the propelling rocket should malfunction.

The removal of personnel from high speed vehicles such as aircraft, rocket sleds, and the like, during emergency situations has often required their bodily ejection from the vehicle. This has usually been accomplished by ejecting the seat structure, together with the occupant thereof, from the vehicle with sufficient force and rapidity to safely clear the vehicle. Since the occupant of the seat is also usually fastened to the seat structure by a restraining harness, lap belt, or the like, it has been necessary that means be provided for releasing and separating him from the seat structure in order that a parachute may be safely deployed for his return to earth. In the proper order of events for effecting a safe removal of personnel in an emergency, the seat structure and occupant are ejected, the occupant is next released from the seat structure, and then forcibly separated and ejected therefrom. The means for releasing the occupant from the seat structure have generally operated independently from the man-seat structure separating means. Consequently, there has always been the danger that such means for releasing the occupant will fail to operate before actuation of the means for separating and ejecting the occupant from the seat. It has also been conventional to employ numerous pyrotechnic severing devices for severing the harness restraining means securing the occupant to the seat structure. Such devices, of course, increase the hazard involved. In addition, many man-seat structure separating systems employ rotary actuators for drawing taut a flexible webbing disposed to lie between the occupant's body and the seat structure. These rotary actuators are relatively complex and do not always respond with desirable rapidity.

The separating apparatus of this invention which has been devised to overcome the attendant disadvantages of the prior art, operates after ejection of the seat structure from the vehicle to ignite an explosive charge which actuates associated linkage mechanisms to release all of the tie-down restraining devices which secure the occupant to the seat. After a time interval sufficient to permit the releases to fully open, the propellant gases from the explosive charge are utilized to ignite a second charge which drives the piston member of a thruster device secured to one end of a flexible separator strap which is normally disposed between the occupant and the seat structure. The separator strap, which is attached at one end near the top of the seat structure and at its other end to the thruster piston located at the front of the seat is snapped taut by the action of the thruster device to thereby forcibly separate and eject the occupant from the seat structure, whereupon a parachute may be deployed either manually or by automatic means for his safe return to earth.

Other objects and many of the attendant advantages of this invention will be readily appreciated as the same become better understood by reference to the following detailed description when considered in connection with the accompanying drawings in which like reference numerals designate like parts throughout the figures thereof and wherein:

FIG. 1 is a perspective view of a seat structure and occupant immediately after ejection from a spacecraft or other vehicle;

FIG. 2 is a diagrammatic perspective view showing the elements of the man-seat structure separating apparatus of this invention as positioned on the seat structure in which it is mounted, with the seat structure shown in broken outline;

FIG. 3 is a side view showing in general outline the positional relationship of the seat structure and occupant during ejection of the seat structure and occupant from a space vehicle;

Figure 6:
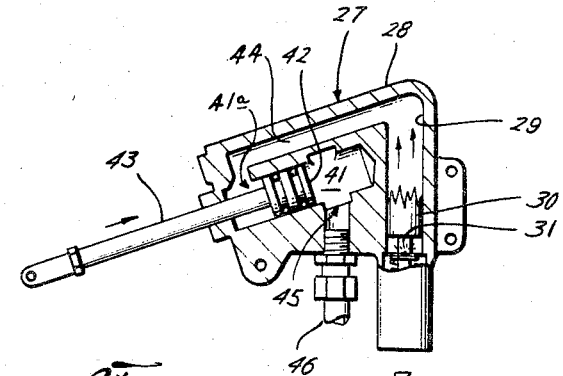
Figure 4:
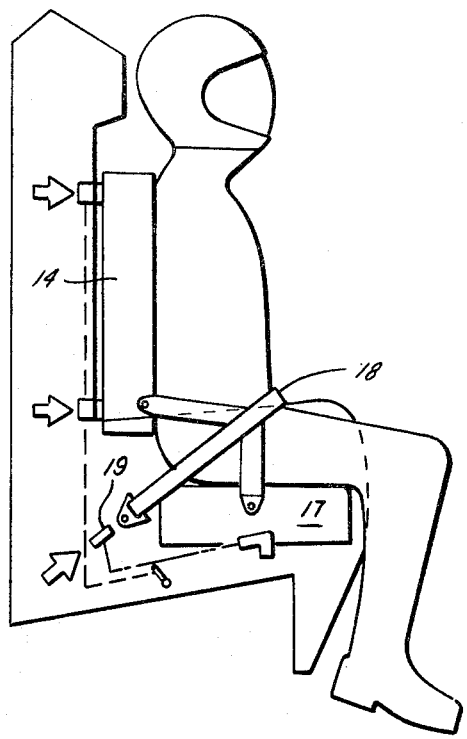
FIG. 4 is a side outline view indicating the points of attachment between the seat structure and the occupant.
Figure 7:
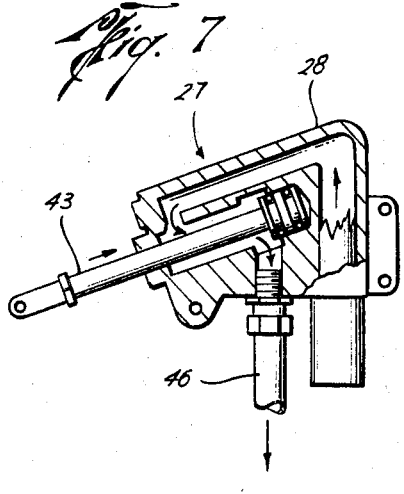

FIGS. 5A, 5B, and 5C illustrate particularly the lanyard-operated actuator indicating the sequence of operation as the lanyard activates the actuator;

FIG. 6 is a sectional view of the actuator which operates linkage mechanisms for releasing the occupant from the seat structure;

FIG. 7 is a sectional view of the actuator similar to FIG. 6, showing the actuator in its final operational phase wherein propellant gases are delivered to the thruster device after the occupant is released from the seat structure;

FIG. 8 is a longitudinal view, partly in section, of the thruster shown in its initial position;

FIG. 9 is a view similar to FIG. 8, but showing the thruster in extended position wherein the flexible strap between the seat structure and occupant is drawn to taut condition; and FIG. 10 is a side outline view similar to FIGS. 3 and 4 showing the occupant separated from the seat by the action of the flexible strap.

Referring more particularly to the drawings, there is shown in FIG. 2 an apparatus 10 which constitutes a preferred embodiment of this invention for separating the occupant of a seat structure from the seat structure after both have been ejected from a spacecraft, as shown in FIG. 1. The seat structure and occupant are driven from the spacecraft by a conventional ejecting means such as a catapult, rocket motor, or the like, which ejecting means does not constitute a part of this invention. The apparatus 10 is mounted on a seat structure 11 which comprises a back section 12 and a seat section 13. The occupant customarily wears a back pack 14 which normally includes a parachute, survival equipment, and a backboard which confronts the back section 12 of the seat structure. Initially, the backboard of the back pack is secured to the back section by an upper release 15 and a lower release 16 in the form of releasable connecting means. As shown in FIG. 4, the occupant also wears an egress kit, or seat pack 17, and is provided with a lap belt 18, the extremities of which are joined to releasable connecting means or releases 19 located at the juncture of the back section 12 and seat section 13, and at opposite lateral sides thereof.

Extending under the seat section 13 is a cross shaft 20 having end levers 21 fixed perpendicularly thereto and pivotally joined to shafts 22 which in turn are pivotally connected with lever arms 23 operatively connected with the lap belt releases 19. The cross shaft 20 is pivotally attached at its center to one end of a lever 24 which at its other end is interconnected by a pivotal crank arm C to a linkage rod 25 operatively connected with the lower release 16. The rod 25 and release 16 are in turn connected by a pull rod 26 to the upper release 15.

The releases 15, 16, and 19 are, for the purposes of this invention, conventional and include latching elements which in the releases 15 and 16 are actuated by a lineal movement of the rods 25 and 26, respectively, and in the case of the releases 19 by an arcuate movement of the lever arms 23 to open the releases and free the lap belt and backboard from attachment with the seat structure. Preferably the backboard in the occupant's back pack is provided with eyelets or hooks which are releasable by the withdrawal of latching elements from the eyelets by operation of the releases 15 and 16, and the lap belt is similarly provided at its extremities with eyelets 19a which are releasably held by the releases 19. The arrangement is such that with rotation of the cross shaft 20 about its longitudinal axis, all four of these releases, which constitute the only means of attachment between the occupant and the seat structure, are operated simultaneously to disconnect and release the occupant from the seat structure.

The rotation of the cross shaft 20 to effect operation of the aforesaid releases is accomplished by means of an actuator 27 which is contained in a housing 28 mounted at one side of the seat structure. As shown in FIG. 5, the housing 28 includes a vertical bore 29 containing a propellant charge 30 and an ignition cap 31. Contained within an enlarged diameter lower portion 29a of the vertical bore 29 is a separable bar 32 which is joined coaxially with a second separable bar 33 by means of interlocking shoulders 34a and 34b, as best shown in FIG. 6A.

The confronting ends of the bars 32 and 33 are initially contained in a cylindrical sleeve 35 so as to maintain the bars in interlocking engagement. The sleeve 35 is mounted coaxially within the bore 29a and held in spaced relation from the bore wall by an end flange 38 of the sleeve which is welded or otherwise secured to the bore wall. The sleeve 35 and the upper separable bar 32 are surrounded by a coiled compression spring 36, the ends of which bear against flanges 37 and 38 on the bar 32 and sleeve 35, respectively. The lower bar 33 is secured at one end to a lanyard 39 which in turn is connected to the space vehicle structure in which the seat structure is initially mounted.

The lanyard 39 is so arranged to predetermined length as to permit a limited movement of the seat structure from the space vehicle before it exerts a pull on the lower separable bar 33. The pull on the lower separable bar 33 results in compressing the spring 36 and withdrawing the separable bars and their interlocking shoulders 34a, 34b from the sleeve 35 so as to permit the shoulders to disengage and free the upper bar. At its upper end, the bar 32 is provided with a firing pin 40 whereby, as the bar 32 is driven upward by the compression spring, the firing pin engages the ignition cap 31.

The actuator housing 28 is also provided with a cylindrical chamber 41 which receives a piston 42. The piston 42 is connected by a shaft 43 to one of the end levers 21 of the cross shaft 20 so that on movement of the piston in its cylinder the cross shaft 20 is partially rotated about its axis and thereby operates the releases 15, 16, and 19. The chamber 41 is also provided with a port 41a which communicates with the vertical bore 29 by means of a flow passage 44. The port 41a is provided adjacent the end of the chamber through which the piston shaft extends so that the piston is driven toward the head end of the cylinder chamber 41 by propellant gases when the propellant charge 30 is fired.

Near the head portion of the chamber 41 there is provided a lateral outlet 45 which communicates with a flow line 46 as shown in FIG. 6. The flow line 46 delivers propellant gas from the chamber 41 to a thruster device 50 for purposes to be hereinafter described. The thruster is located between the legs of the occupant on the front of the seat.

Mounted on the seat structure so as to underlie the occupant's seat pack 17 and back 14 is a flexible separator strap 47, as best shown in FIG. 2. The separator strap, fabricated of nylon, or the like, is Y-shaped and includes divided portions 47a and 47b extending upwardly between the back portion 12 of the seat structure and the occupant's back pack 14, with its extremities being attached to the upper extremity of the seat structure, as by hooks 49 shown in FIG. 1. The lower part 47c of the separator strap extends forwardly from its divided portion between the seat portion 13 and occupant's seat pack 17, and continues around a slide bar 54 mounted at the forward extremity of the seat portion. The strap then terminates in a U-loop 55, as shown in FIG. 10.

Secured to the forward portion of the seat structure in essentially vertical position is the thruster device 50 comprising a cylinder 57 and a cylinder head 58, as shown in FIGS. 8 and 9. The cylinder head 58 is provided with a small axial bore 59 which contains a firing pin member 60 initially held in the bore by a shear wire or pin 61. The firing pin is adapted to fire an initiator cap 62 also disposed in the bore 59 and adapted to actuate a propellant charge 63. The cartridge 63 is supported on the cylinder head 58 across the end of the bore 59. The bore 59 is connected through the flow line 46 in communication with the lateral outlet 45 in the actuator 27.

Fitted within the cylinder 57 of the thruster is a piston 66 which includes a piston stem 67 extending downwardly therefrom. The stem 67 has a slide or roller 70 affixed transversely at its lower end. The extremity of the U-loop of the separator strap is attached to an eye 71 secured to the front of the cylinder 57 and the U-portion loops around the slide 70.

The man-seat structure separating apparatus of this invention operates as hereinafter described. Upon firing the catapult or rocket ejecting means by either manual or automatic controls, the seat structure and occupant are ejected from the space vehicle as a unit. After initial travel, predetermined by the length of the lanyard 39, the actuator 27 is actuated by the firing of the propellant charge 30. The propellant charge is so arranged that a predetermined interval occurs before the pressure has built up sufficiently to operate the piston 42 and in turn effect operation of the releases 15, 16, and 19.

The propellant cannot exhaust into the flow line 46 until the gases have driven the piston to the right side of the cylinder 41 with the linkage shaft 43, as shown in FIG. 7, whereupon the releases have functioned to disconnect the occupant from the seat structure. Immediately after the occupant is freed, the propellant gases flow through the flow line 46 causing the firing pin 60 to ignite the initiator cap 62 and propellant charge 63 so that the piston 66 and stem 67 are forced from the thruster cylinder 57. The downward movement of the stem 67 causes the separator strap 47 to straighten, that is, move from the position shown in FIG. 2 to the position shown in FIG. 10, forcing the occupant and the seat structure away from each other. On separation, a second lanyard, not shown, of predetermined length, may be used to release a parachute from the back pack 4 in a conventional manner. Alternatively, the aviator or astronaut may operate the parachute or parachutes manually.

It will therefore be seen that a novel occupant-seat structure separating apparatus is described herein which is particularly adapted for use with flight vehicle escape systems in which the seat structure and occupant are ejectable as a unit from the vehicle. By operation of this invention the various tie-down restraining devices which secure the occupant to the seat structure are individually freed by operation of mechanical releases, rather than by pyrotechnic severing devices. It is also to be noted that these mechanical releases can only open in response to operation of the actuator after the seat structure and occupant have been ejected a predetermined distance from the vehicle. Furthermore, the separation of the occupant from the seat structure is accomplished by a thruster device of simple construction which draws the flexible separator strap between the occupant and seat to a taut condition in a quick-acting manner. The operation of the thruster follows the release of the occupant and occurs in a sequence which is positively controlled by the actuator. While the thruster device is located at the front of the seat section and the separator strap is fixedly attached near the top of the back section of the seat structure in the preferred embodiment of the invention herein described, the locations of the thruster and the fixed point of attachment of the separator strap may, of course, be reversed if desired.

What is claimed and desired to be secured by Letters Patent is:

1. For use in a vehicle escape system, an occupant and seat structure separating device comprising:
    an ejectable seat structure having a seat back section and a seat pan section;
    restraining means for securing the occupant to the seat structure when said restraining means are connected to the seat structure;
    a plurality of releasable connecting means connecting said restraining means to the seat structure;
    a flexible strap extending along the seat back section and the seat pan section and disposed between the seat structure and its occupant;
    actuator means for releasing said releasable connecting means and thereby said restraining means, said actuator means comprising a gas generating means in the form of a detonatable propellant charge and a triggering means for initiating operation of said gas generating means;
    linkage means responsive to operation of said gas generating means for releasing said releasable connecting means, said triggering means comprising
        a firing pin,
        a lanyard attached at one end to said vehicle,
        a releasable coupling means connecting the other end of said lanyard to said firing pin,
        a sleeve member mounted on said actuator means and sleeved over said coupling means to constrain said coupling means in coupled relationship, said coupling means being releasable upon withdrawal from said sleeve member,
        spring means urging said firing pin into detonating engagement with said gas generating means when said coupling means is released by a pull exerted by the lanyard upon ejection of the seat structure from the vehicle, and
    thruster means responsive to operation of said actuator means to draw the ejection strap to taut condition and thereby forcibly separate the occupant from the seat structure.

2. For use in a vehicle escape system, an occupant and seat structure separating device comprising:
    an ejectable seat structure having a seat back section and a seat pan section;
    releasable restraining means for securing the occupant to the seat structure;
    actuator means for releasing said restraining means, said actuator means comprising a detonatable gas generating means and a triggering means for initiating operation of said gas generating means;
    linkage means responsive to operation of said gas generating means for releasing said restraining means, said triggering means comprising:
        a firing pin,
        a lanyard attached at one end to said vehicle,
        a releasable coupling means connecting the other end of said lanyard to said firing pin, said coupling means being releasable by a pull exerted thereon by said lanyard, and
        spring means urging said firing pin into detonating engagement with said gas generating means when said coupling means is released by a pull exerted by the lanyard upon ejection of the seat structure from the vehicle.

3. A separating device as described in claim 2 further including a flexible ejection strap extending along the seat back section and the seat pan section and disposed between the seat structure and its occupant, and thruster means responsive to operation of said actuator means to draw the ejection strap to taut condition and thereby forcibly separate the occupant from the seat structure.

4. For use in a vehicle escape system, an occupant and seat structure separating device comprising:
    an ejectable seat structure having a seat back section and a seat pan section;
    restraining means for securing the occupant to the seat structure when said restraining means are connected to the seat structure;
    a plurality of releasable connecting means releasably connecting said restraining means to the seat structure;
    a flexible strap extending along the seat back section and the seat pan section and disposed between the seat structure and its occupant, said strap being fixedly connected to the seat structure near the top of the seat back section;
    actuator means for opening the plurality of releasable connecting means which secure said restraining means to the seat structure, said actuator means comprising a detonatable gas generating means and a piston and cylinder assembly in which the piston is movable from a first position in said cylinder to a second operative position by actuation of said gas generating means;
    a mechanical linkage interconnecting said piston and said plurality of releasable connecting means, whereby the releasable connecting means secure said restraining means to the seat structure when said piston is in its first position and said releasable connecting means are opened to release said restraining means when said piston is in its second operative position;
    a triggering means for initiating operation of said gas generating means, said triggering means comprising a firing pin, a lanyard attached at one end to said vehicle, a releasable coupling means connecting the other end of said lanyard to said firing pin, a sleeve member mounted on said actuator means and sleeved over said coupling means to constrain said coupling means in coupled relationship, said coupling means being releasable upon withdrawal from said sleeve member, spring means urging said firing pin into detonating engagement with said gas generating means when said coupling means is released by a pull exerted by the lanyard upon ejection of the seat structure from the vehicle; and thruster means comprising a piston and cylinder assembly mounted on the seat structure at the front of the seat pan section, with said piston coupled to the other end of the flexible strap, said thruster means being responsive to operation of said actuator means for drawing the flexible strap to taut condition by lineal movement of the piston within said cylinder, to thereby forcibly expel the occupant from the seat structure.

5. An occupant and seat structure separating device as described in claim 4 wherein said gas generating means is a detonatable explosive charge.

6. An occupant and seat structure separating device as described in claim 4 wherein said thruster means further comprises a gas generating means responsive to gas pressure from said actuator gas generating means for driving said piston from said first position to said second operative position.

7. An occupant and seat structure separating device as described in claim 6 wherein the gas generating means in said thruster means is a detonatable explosive device.

References Cited

UNITED STATES PATENTS

| | | | |
|---|---|---|---|
| 3,083,938 | 4/1963 | Brinkworth et al. | 244—122 |
| 3,093,353 | 6/1963 | Pisano et al. | 244—122 |
| 3,096,957 | 7/1963 | Peterson et al. | 244—122 |
| 3,189,967 | 6/1965 | Walker et al. | 244—122 X |

FERGUS S. MIDDLETON, *Primary Examiner.*

MILTON BUCHLER, *Examiner.*

B. BELKIN, *Assistant Examiner.*